United States Patent [19]
Brandt, Jr.

[11] Patent Number: 5,219,031
[45] Date of Patent: Jun. 15, 1993

[54] PARTICLE WEIGHING SYSTEM

[76] Inventor: Robert O. Brandt, Jr., 5404 Pond Dr., Wilmington, N.C. 28403

[21] Appl. No.: 662,419

[22] Filed: Feb. 28, 1991

[51] Int. Cl.$^5$ .................. G01G 19/00; G01G 3/14
[52] U.S. Cl. ........................... 177/145; 177/211
[58] Field of Search .......................... 177/145, 211

[56] References Cited

U.S. PATENT DOCUMENTS

| | | |
|---|---|---|
| 3,501,951 | 3/1970 | Giles . |
| 3,605,953 | 9/1971 | Caldwell et al. . |
| 4,165,975 | 8/1979 | Kwiatkowski et al. ........ 177/16 X |
| 4,490,803 | 12/1984 | Briggs . |
| 4,627,635 | 12/1986 | Koleda . |
| 4,696,358 | 9/1987 | Doerman et al. ............... 177/145 |
| 5,062,518 | 11/1991 | Chitty et al. .................... 177/211 X |

Primary Examiner—George H. Miller, Jr.
Attorney, Agent, or Firm—Rosenthal & Putterman

[57] ABSTRACT

A dynamic weighing apparatus for determining the mass of a group of particles or single particle while in motion is disclosed. The apparatus comprises a guide for guiding the material to be weighed along a predetermined path and having an entry end and an exit end. A transducer is operatively associated with the exit end of the guide and includes a mechanical column connected between a load cell and the exit end of the guide means. The load cell produces an electrical output signal proportional to the mass of particles on the guide.

18 Claims, 3 Drawing Sheets

PARTICLE WEIGHING SYSTEM

FIELD OF THE INVENTION

This invention relates generally to the field of weighing systems and more specifically to the field of determining the weight of particles while in motion.

BACKGROUND OF THE INVENTION

Numerous products available to consumers today are placed in packages that contain a quantity like items, such as hardware components (screws, washers, nuts, etc.) and office supplies (such as paper clips, etc.). These packages may be labelled according to the number of items contained therein or by the weight of the contents. However, in reality, the vast majority of these products are packaged by placing a predetermined volume of the product into the package and then weighing the filled package (or counting the items in the package) and then accordingly adjusting the volume placed in subsequent packages in order to obtain proper package weight. This method of dispensing products into packages is less than optimal as packages that are significantly under or over weight are either discarded or their contents recycled back into the filling system. It is also suboptimal as the contents of the package are not weighed prior to placement in the package and it is, thus, impossible to control particular package weights.

In addition, high speed systems have been developed to weigh particles. In systems of this type, the particles are dropped on to a platform from a fixed known height. The impact of the particles on the platform produces an electrical signal output in a load cell positioned beneath the platform. The load cell output is then used to calculate the particle weight. However, systems of this type are not without their inherent drawbacks and defects. For example, the accuracy of this type of weighing device is dependent on the characteristics of the material to be weighed. Thus, the scale must be adjusted for variations in particle density as well as variations in other surface characteristics. Another drawback of systems of this type is the fact that the measurement is based on the force exerted at the moment of impact and the entire measurement takes place in a "window" that is on the order of a few milliseconds (5–8 ms). Measurement signals thus obtained are subject to a high degree of resonant frequencies and noise which result in a degradation in overall measurement accuracy.

In view of the foregoing, it is accordingly an object of the present invention to provide a weighing system that is accurate.

Another object of the present invention is to provide a weighing system that is fast.

Still another object of the present invention is to provide a weighing system that may be incorporated into high speed packaging systems.

Yet another object of the present invention is to provide a weighing system wherein the weight calculation is based on a measurement signal of extended duration, thus, reducing undesired noise and resonance signals and yielding a more accurate weight measurement.

A still further object of the present invention is to provide a weighing system that is more efficient than systems of the prior art.

A still further object of the present invention is to provide a system that can also be employed as a continuous flow meter.

SUMMARY OF THE INVENTION

To accomplish the foregoing objects, there is provided a dynamic weighing apparatus for determining the mass of a weighable unit in the form of a group of particles or a single particle characterized by the ability to accurately weigh the weighable unit while in motion. The weighing apparatus comprises an elongate guide means for guiding the weighable unit along a predetermined path. The guide means includes an entry end and an exit end. A transducer means is operatively associated with the guide means for converting the force exerted by the weighable unit on the guide means into an electrical output signal representative thereof. The transducer means comprises a load cell means for converting an input signal in the form of an applied mechanical force into an electrical output signal that is a function of the applied mechanical force. The transducer means also includes a column means for communicating the force exerted by the weighable unit on the guide means to the load cell means. The column means includes a first end and a second end, the first end of the column is connected to the guide means and the second end is connected to the load cell means.

BRIEF DESCRIPTION OF THE DRAWINGS

Some of the features and advantages of the invention having been briefly described, others will appear from the detailed description which follows, when taken in connection with the accompanying drawings in which.

DETAILED DESCRIPTION OF THE PREFERRED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
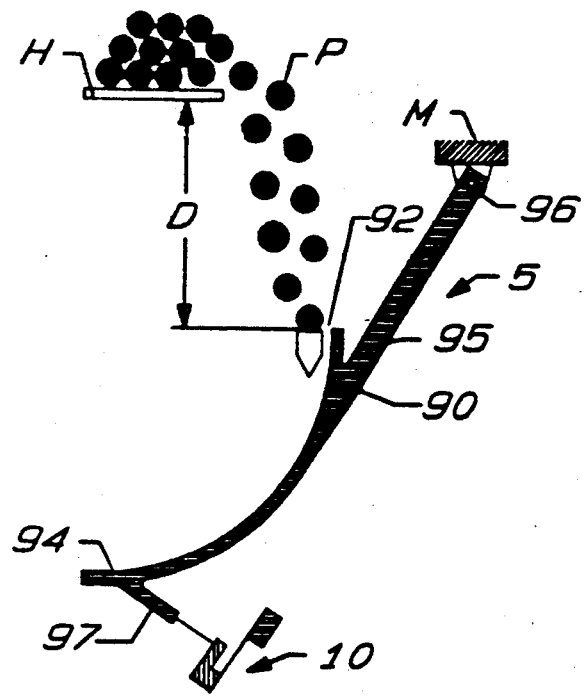
FIG. 1 is a side view of the dynamic weighing apparatus of the present invention and showing a hopper of particles to be weighed being dispensed on to the guide means.

Referring now to the figures, and particularly to FIG. 1, the weighing apparatus of the present invention is there illustrated. In that figure, a weighable unit of particles P is stored in a schematically shown dispensing hopper H that is positioned a predetermined distance D above the point of impact of the particles P on the weighing apparatus, generally indicated at 5. The weighing apparatus comprises a elongate guide means 90 and a transducer means generally indicated at 10.

Figure 8:
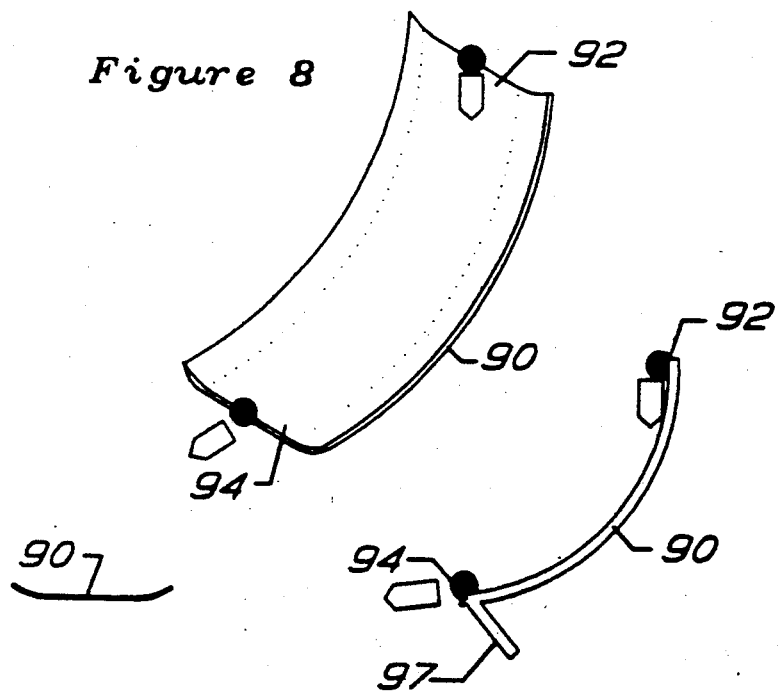
FIG. 8 includes a perspective view and a side view of a particle travelling along and exiting the guide means according to the present invention.

The elongate guide means or guide 90 is provided for guiding the weighable unit along a predetermined path. The guide 90 includes an entry end 92 and an exit end 94. The guide 90 is curved along the portion that extends between the entry and exit ends 92,94. In addition, a straight arm section 95 extends upwardly from the entry end 92 and pivot point 96 is located at the far end thereof. The pivot point takes the form of a hole defining an opening which is adapted to receive a screw and nut that connects to a mounting block M that supports the guide means 90. It is desirable to minimize the mass of the guide 90, and it, therefore, is preferably fabricated out of a sturdy lightweight material, such as aluminum, plastic, and the like. Also, it is necessary that the particles stay on the guide 90 as they move therealong in order to maximize measurement accuracy and the sides of the guide, accordingly, include a slight upturn as shown in FIG. 8. Located near the exit end 94 of the guide 90 is a relatively short downwardly extending arm 97, the function of which will become apparent as the specification proceeds. Those skilled in the art will recognize that the pivot point 96 could be created with a variety of structures such as ball bearings or a flexure mounted within the opening.

Figure 2:
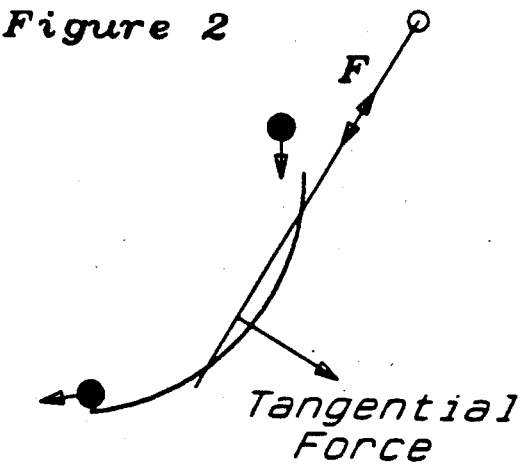
FIG. 2 is a schematic diagram illustrating the forces exerted on the guide means by a particle being dropped and travelling along the guide means.

An important feature of the guide 90 resides in the relation between the pivot point 96 and the tangential force component of the weighable unit as it contacts and travels along guide 90. Specifically, the guide 90 is shaped so that the axis drawn through the guide 90 to the pivot point 96 is at right angles to the tangential force component of the weighable unit as the weighable unit traverses the guide. In this manner, the average friction force component of particle traversing the guide is equal to and opposite the force exerted on the pivot, thus, cancelling each other and yielding a force component that is related to the mass of the weighable unit. This principle is illustrated in the force diagram of FIG. 2.

Figure 3:
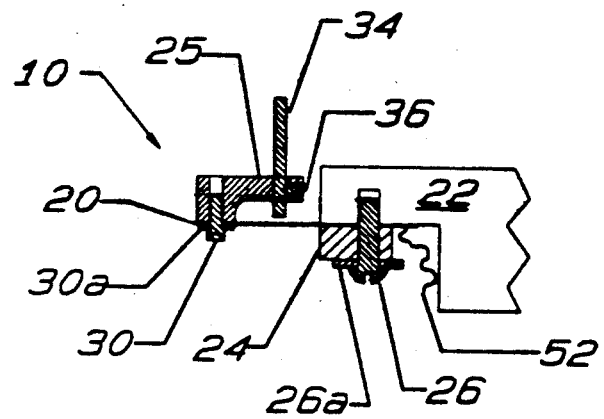
FIG. 3 is a side view of the transducer means of the present invention.

As shown in FIG. 1, the weighing apparatus also includes a transducer means or force sensing system generally indicated at 10 operatively associated with the guide means for converting the force exerted by the weighable unit on the guide means into an electrical signal representative thereof. Referring now to FIG. 3, the transducer means includes a load cell means or weigh beam 20 that is secured to a mounting base 22 through a beam mounting block 24. An attaching screw 26 extends through beam mounting block 24 and with the assistance of a washer 26a secures beam mounting block 24 and beam 20 to the mounting base 22 of the measurement system 10.

Secured to the opposite end of weigh beam 20 is a mounting bracket 25. Mounting bracket 25 is secured to weigh beam 20 via screw 30 and associated washer 30a.

A column means or displacement transfer link 34 is provided for communicating the force exerted by the weighable unit on the guide 90 to the load cell. The column has a first end that is connected to the guide proximate the exit end 94 and a second end that is adjustably mounted within bracket 25 by set screw 36. Column 34 extends upwardly over the central portion of the weigh beam 20. This arrangement is commonly referred to as an S-loaded weigh beam which yields greater force multiplication as bending of the beam affects two locations and, therefore, exaggerates loading on the sensors as will be more fully described hereinbelow. It will be noted, that the benefits and advantages of the present invention can be achieved with equal efficacy when other beam loading arrangements such as cantilevers are employed.

Figure 4:
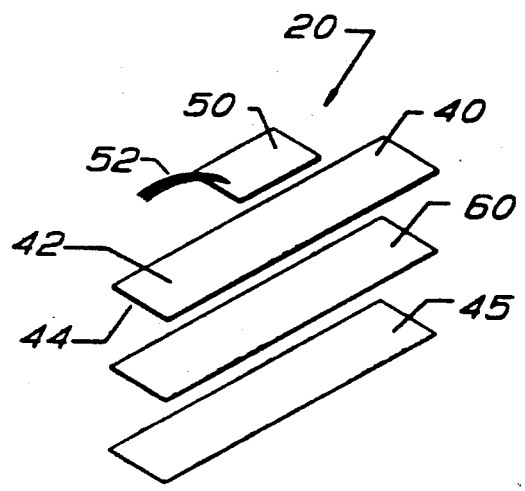
FIG. 4 is an exploded view, taken in perspective, of the load cell means of the present invention.
Figure 5:
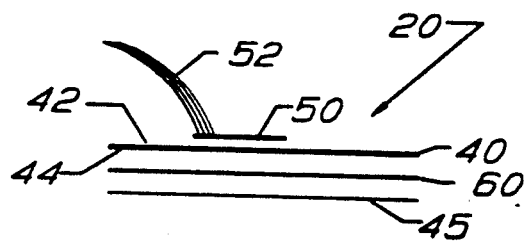
FIG. 5 is an exploded side view of the load cell means of the present invention.
Figure 6:
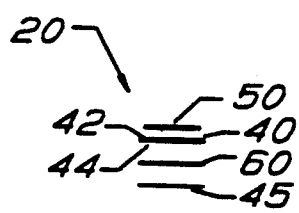
FIG. 6 is an exploded end view of the load cell means of the present invention.
Figure 7:
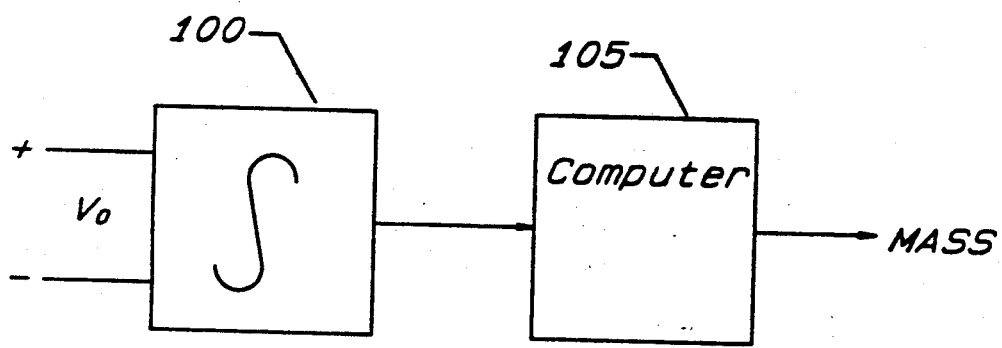
FIG. 7 is a schematic diagram of the computations performed on the load cell output signal to calculate the mass of the weighable unit according to the present invention.

Turning now to FIGS. 4 through 6, the load cell or weigh beam 20 according to the present invention is there illustrated. The load cell 20 is characterized by its ability to accurately measure applied force of short duration (between about three seconds and two milliseconds) and to produce an output signal that is a function of the applied force that is substantially free of resonant vibration. The load cell 20 comprises a substrate or beam member 40, a strain gauge 50 and a damping means 60.

The beam member 40 comprises an elongate substantially flat substrate having a first surface 42 and a second surface 44.

A strain gauge means or strain gauge 50 is mounted to one of the surfaces (in the illustrated embodiment surface 42). The preferred strain gauge is a semiconductor or metal foil Wheatstone bridge, well known to those skilled in the art. The strain gauge and beam member units are usually purchased preassembled as an off the shelf unit from suppliers such as Omega electronics (see for example, part numbers LCL 454G and LCL 113G). As the Wheatstone bridge generates four output signals, four output wires 52 therefrom are, accordingly, provided.

The load cell also includes a damping means or viscoelastic polymer 60 that coats at least a portion of one of the surfaces 42, 44 of beam member 40. Visco-elastic polymers suitable for use in the load cell 20 of the present invention are of the SCOTCHDAMP® family as manufactured by the 3M Company. In the illustrated embodiment, the visco-elastic polymer is bonded to the entire underside of the beam member 40 according to conventional methods. However, it will be noted that coating the entire under surface may not necessarily be required, depending on the sensitivity needed for a particular measurement application. In addition, should further damping be required, the visco-elastic may be sandwiched between a second substrate 45 or metal constraining layer (such as stainless steel) as shown in FIGS. 4–6 and bonding the substrates together.

The load cell described above is a accurate and reliable measurement tool as long as the temperature of the environment in which it is located remains constant. Those knowledgeable in the use of visco-elastic polymers will certainly be aware of the fact that the energy absorptive properties of visco-elastics vary significantly with even small variations of temperature. Thus, in order for this concept to find the widest application, it is necessary to maintain the visco-elastic at a constant temperature.

In operation, the particles P in the weighable unit are dispensed from the hopper or other dispensing apparatus on to the guide means 90 and impact tangentially thereon. This causes a slight flexure at the pivot point and displacement of the exit end 94 of the guide and the column 34 which in turn is transmitted through the column 34 to the load cell causing a proportional deformation of weigh beam 20. The deformation of weigh beam 20 then causes a similar deformation in the strain gauge 50 which produces an electrical output signal $V_O$ in lines 52 that is proportional to the force exerted on guide 90. This electrical signal is then integrated in integrator 100 and output to a computing means or computer 105 in order to calculate the mass of the weighable unit according to methods well known to those skilled in the art.

In a further application of the invention, the apparatus described above may also be employed as a continuous flowmeter. Instead of a weighable unit being dispersed on to the guide means, the guide means is subjected to a continuous flow of particles. If the flow of particles is constant, the column will deform proportionally and similarly cause a steady-state (constant) output signal $V_O$ to be output on lines 52 from the load cell. Any variation in flow rate will be observed as a variation in output signal $V_O$. Thus, $V_O$ may be digitally sampled and the information output to a control device such as a computer that can be used to adjust the system as needed in order to return to the optimal flow rate.

The foregoing embodiments and examples are to be considered illustrative, rather than restrictive of the invention, and those modifications which come within the meaning and range of equivalence of the claims are to be include therein.

That which is claimed is:

1. A dynamic weighing apparatus for determining the mass of a weighable unit in the form of a group of particles or a single particle characterized by the ability to accurately weigh the weighable unit while in motion and comprising:

an elongate guide means for guiding the weighable unit along a predetermined path, said guide means including an entry end and an exit end; said elongate guide means being adapted to be mounted for pivotal movement about a pivot point; and wherein an axis drawn through said elongate guide means and said pivot point are at right angles to the tangential force component of the weighable unit as the weighable unit traverses said guide means to produce an electrical signal output that is free of signals induced by friction and is an accurate representation of the mass of the weighable unit, and a transducer means operatively associated with said guide means for converting the force exerted by the weighable unit on said guide means into an electrical signal representative thereof, whereby the mass of the moving weighable unit may be accurately measured.

2. The dynamic weighing apparatus according to claim 1 wherein the entry end of said elongate guide means is adapted to be mounted for pivotal movement about a pivot point.

3. The dynamic weighing apparatus according to claim 1 wherein the weighable unit enters the guide means proximate its entry end, and at the point of initial contact with the guide means is tangential thereto.

4. The dynamic weighing apparatus according to claim 1 wherein said transducer means comprises:

(a) a load cell means for converting an input signal in the form of an applied mechanical force into an electrical output signal that is a function of the applied mechanical force;

(b) a column means for communicating the force exerted by the weighable unit on said guide means to said load cell means, said column means having a first end and a second end, the first end of said column means being connected to said guide means, and the second end thereof connected to said load cell means.

5. The dynamic weighing apparatus according to claim 4 wherein the first end of said column means is connected proximate the exit end of said guide means.

6. The dynamic weighing apparatus according to claim 4 wherein said load cell means comprises:

(a) an elongate substantially flat substrate having a first surface and a second surface;

(b) a strain gauge means mounted to one of said surfaces, said strain gauge means including output means for providing an electrical output signal as a function of the force applied to said substrate.

7. The dynamic weighing apparatus according to claim 6 wherein said strain gauge means comprises a metal foil strain gauge.

8. The dynamic weighing apparatus according to claim 6 wherein said strain gauge means comprises a semiconductor strain gauge.

9. The dynamic weighing apparatus according to claim 6 wherein said strain gauge means comprises a sputtered strain gauge.

10. The dynamic weighing apparatus according to claim 6 wherein said strain gauge means comprises a bridge circuit.

11. The dynamic weighing apparatus according to claim 6 wherein said bridge circuit comprises a Wheatstone bridge circuit.

12. The dynamic weighing apparatus according to claim 6 further including a damping means coating at least a portion of one of said surfaces; whereby the applied force acting to deform the load cell is translated into an electrical output signal, substantially free of resonant vibration and a function of the mass of the weighable unit.

13. The dynamic weighing apparatus according to claim 12 wherein said strain gauge means produces an electrical output signal that is substantially proportional to the force applied to said substrate.

14. The dynamic weighing apparatus according to claim 12 wherein said damping means comprises a visco-elastic polymer.

15. The dynamic weighing apparatus according to claim 2 further including a second substrate and wherein said damping means is positioned in sandwich fashion between said substrate and said second substrate and bonding said substrates together.

16. A dynamic weighing apparatus for determining the mass of a weighable unit in the form of a group of particles or a single particle characterized by the ability to accurately weigh the weighable unit while in motion and comprising:

an elongate guide means for guiding the weighable unit along a predetermined path, said guide means including an entry end and an exit end; and wherein said entry end is adapted to be mounted for pivotal movement about a pivot point;

a mechanical column having a first end and a second end, the first end of said column being connected to the exit end of said guide means;

a load cell having a proximal end and a distal end for converting an applied mechanical force to a proportional electrical output signal, and wherein the distal end of said load cell is operatively associated with the second end of said mechanical column and the proximal end of said load cell is adapted to be connected to a mounting block;

whereby a weighable unit acting on said guide means will produce an electrical signal output proportional thereto.

17. A dynamic weighing apparatus according to claim 16 further including means for calculating the mass of said weighable unit.

18. A dynamic weighing apparatus according to claim 17 wherein load means for calculating the mass of said weighable unit further includes a means for integrating the electrical signal over time and means for relating the integrated signal to calculate the mass of the weighable unit.

* * * * *